(12) United States Patent  
Hill et al.

(10) Patent No.: US 7,069,008 B1  
(45) Date of Patent: Jun. 27, 2006

(54) SYSTEMS AND METHODS FOR AUTOMATIC SELECTION OF AN OPTIMAL AVAILABLE DATA BEARER

(75) Inventors: Norman D. Hill, Stone Mountain, GA (US); Donald M. Cardina, Lawrenceville, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 264 days.

(21) Appl. No.: 10/633,236

(22) Filed: Aug. 4, 2003

(51) Int. Cl.  
*H04Q 7/20* (2006.01)

(52) U.S. Cl. .................. 455/434; 455/464; 455/432.1; 370/401; 370/357; 709/227

(58) Field of Classification Search ................ 455/434, 455/432.1, 464; 370/401, 357; 709/227  
See application file for complete search history.

(56) References Cited

U.S. PATENT DOCUMENTS

2002/0029275 A1* 3/2002 Selgas et al. ............... 709/227
2002/0143897 A1  10/2002 Patil
2002/0163938 A1  11/2002 Tuomainen et al.
2004/0052212 A1* 3/2004 Baillargeon ................. 370/235
2004/0087305 A1* 5/2004 Jiang et al. ............... 455/432.1
2004/0147285 A1* 7/2004 Urien ......................... 455/558
2005/0009516 A1* 1/2005 Stumpert et al. ........... 455/428

* cited by examiner

*Primary Examiner*—Danh Cong Le  
(74) *Attorney, Agent, or Firm*—Parks Knowlton LLC; Cynthia R. Parks, Esq.; Coulter Henry

(57) ABSTRACT

A mobile station attempts to access wireless data services such as WAP applications via a data call, by first transmitting a session request to a wireless network, where the session request identifies an initial data bearer that should be used to establish the session. Upon receiving notification that the network is unable to establish the data session using the initial data bearer, the mobile station accesses a bearer table stored in its memory, selects an alternate data bearer which may be the next best data bearer, and automatically reattempts the data call without user intervention. The process repeats until the session is successfully established using one of the data bearers in the bearer table, or until the occurrence of a terminating event, such as cancellation of the data call by the user of the mobile station, or expiration of a predetermined time limit.

22 Claims, 3 Drawing Sheets

SYSTEMS AND METHODS FOR AUTOMATIC SELECTION OF AN OPTIMAL AVAILABLE DATA BEARER

BACKGROUND OF THE INVENTION

1. Field of Invention

The present invention is related to utilization and access to wireless data services, and more particularly, to systems and method for automatic selection of the optimal data bearer that is actually available to a mobile station for a particular data transaction.

2. Description of Related Art

Although wireless data services such as the Wireless Application Protocol (WAP) are typically designed to work optimally with all air interfaces, optimizing the selection of an appropriate data bearer improves the quality of service (QoS) experienced by the end user of a mobile station and the improves overall performance of the wireless network. Optimal bearer selection strategies are typically tailored at least in part to improve transmission bit rates, decrease the bit error rate (BER), and to minimize call set-up and transfer delays.

One bearer selection strategy assigns a default data bearer to a mobile station. Whenever a data call is attempted by the mobile station, this default data bearer is used to establish the connection for the data call. The default bearer assigned to the mobile station may automatically change, for example according to the physical location of the mobile station as indicated by the MCC (Mobile Country Code) or other geographic indicator.

Another bearer selection strategy applies a bearer identification tag to data that is to be transmitted, the bearer identification tag identifying the data as best being transmitted over a specific data bearer. As an example, according to this strategy, when a WAP client initiates a data call using a first data bearer (which may be a default) the requested data is parsed and delivered over an optimal data bearer, which is identified according to the bearer identification tag assigned to the requested data.

Yet another bearer selection strategy initiates a data call using a first data bearer, and switches to a second data bearer at some point either before or during the data transaction according to a predefined bearer need condition, such as the completion of a set-up phase of the second data bearer, the amount of data to be transmitted, or the type of WAP application that is associated with the data.

More recently, technology has evolved such that a mobile station may be "aware" of whether it is attached to a network that supports a given optimal data bearer, such as GPRS, through a process of periodic registration. Thus, the mobile station is at all times ready to establish a data call using the optimal data bearer identified through registration.

Regardless of the bearer selection strategy employed, at times, the selected data bearer is unavailable, such as when network infrastructure issues render the bearer physically unavailable or where a roaming mobile station is prohibited access to a bearer by policy or capacity restraints of the Roamed Carrier. If a data call is initiated under these circumstances, the call will fail, even when other alternative—albeit less optimal—bearers are available. Typical attempts to solve this problem require the user of the mobile station to manually select an alternate data bearer, sometimes repeatedly. Users often are not aware manual bearer selection is available to them, or the users forget how to manually change to an alternate bearer to retry the data call. Furthermore, the average mobile station user may have no knowledge of the appropriate bearer to select as the next best alternative to the optimal or default bearer. Thus, such purported solutions are lacking particularly because a mobile station user is required to take action to establish a data connection that should be transparent.

SUMMARY OF THE INVENTION

The present invention addresses the shortcomings identified in the prior art by providing systems and methods for automatic selection of the optimal data bearer that is actually available to a mobile station at the time of initiation of a data call.

Generally, the present invention provides systems and methods that obviate the need for the user of a mobile station to actively circumvent the optimal or default but unavailable data bearer. Rather, if the optimal or default data bearer is unavailable when the mobile station attempts to place a data call, application layer logic within the mobile station causes the mobile station to retry the data call using, for example, the next best data bearer. Preferably, the mobile station cycles through data bearers until an available data bearer is found and a data link is established for the data call, or for a predetermined period of time.

More specifically, one aspect of the present invention is a method for automatically selecting an available data bearer for a data call initiated by a mobile station. First, the mobile station initiates a data call sequence, preferably in response to receiving a user command via an input device or in response to a network command. The mobile station generates a session request which can include identification of an initial data bearer to be used to carry out the data call. The session request is transmitted to the wireless network, which returns a session status message, the session status message indicating whether the session requested was successfully established. If the session requested was not successfully established, the mobile station generates and transmits a new session request, the new session request indicating an alternate data bearer for the data call.

According to another aspect of the present invention, the mobile station includes an application layer that comprises a memory and controller. The memory contains a data bearer table, and program instructions. The controller invokes at least a portion of the program instructions stored in the memory in response to initiation of a data call. These program instructions cause the controller to generate the session request, transmit the session request to the wireless network, receive the session status message from the wireless network, and if the session requested was not successfully established, to generate and transmit a new session request, the new session request indicating an alternate data bearer for the data call. The new session request includes an alternate data bearer that is identified by the controller by accessing the table for storing a list of data bearers.

The mobile station also includes a device layer. The device layer consists at least in part of a user interface that includes an input device for receiving commands from the user of the mobile station and an output device for communicating information regarding the status of the session request to the user of the mobile station. The device layer also includes a transmitter for sending session requests to the wireless network, and a receiver for receiving the session status message.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
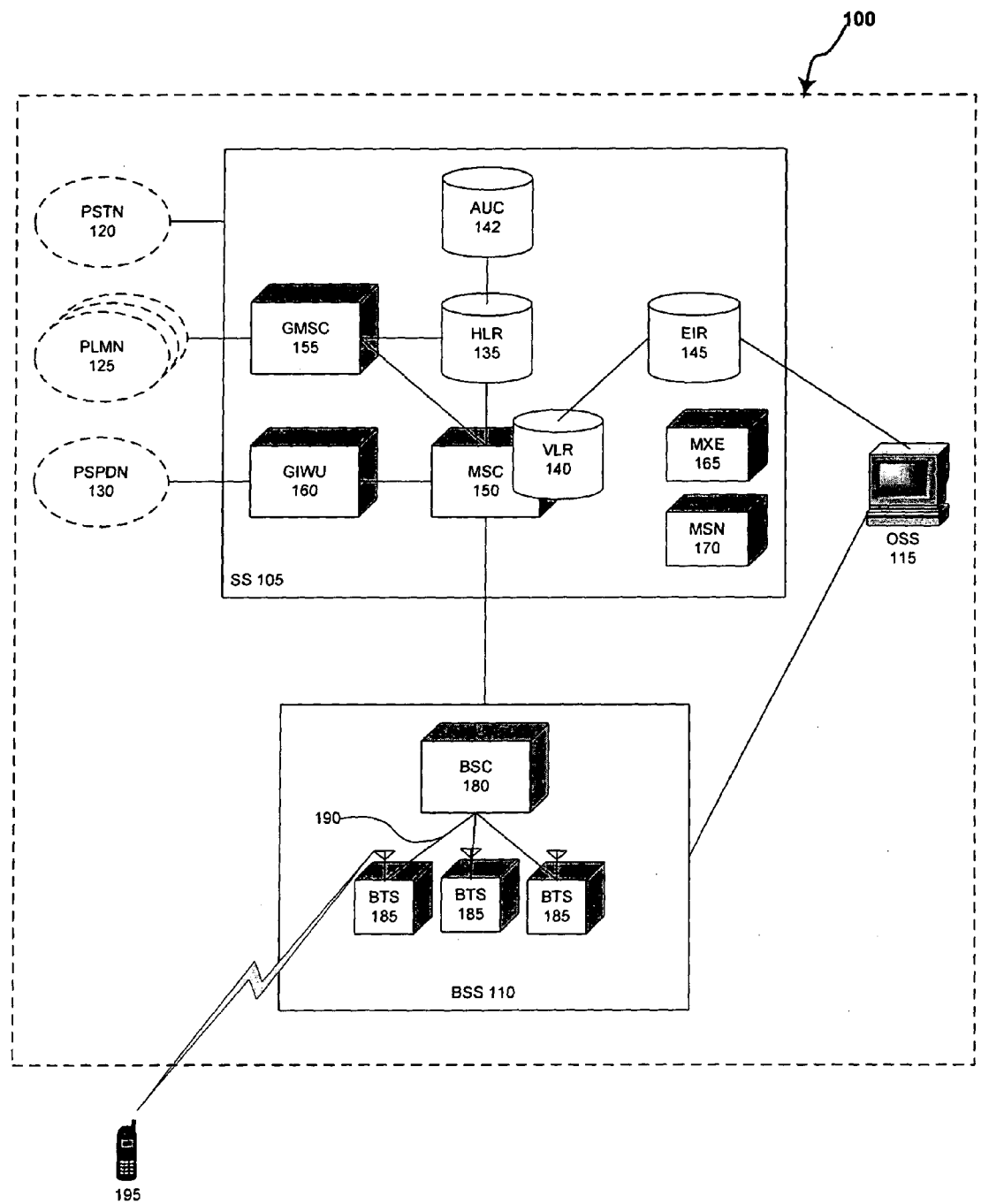
FIG. 1 is a block diagram illustrating an exemplary environment for the various embodiments of the invention.

Particular embodiments of the present invention will now be described in greater detail with reference to the figures. FIG. 1 is a block diagram illustrating an exemplary environment for the various embodiments of the invention. As shown in FIG. 1, the exemplary environment is a GSM (Global System for Mobile Communications) network 100, although those skilled in the art will appreciate that the present invention can be implemented in various other existing and yet to be developed wireless and radio frequency data transmission systems, including networks utilizing EDGE, TDMA, FDMA, WCDMA, OFDM, UMTS, CDPD, CDMA, PDC, PHS, FLEX, ReFLEX, iDEN, TETRA, DECT, DataTAC, Mobitex, GPRS, and similar communications protocols.

The GSM network 100 includes three major subsystems—namely, a switching system (SS) 105, a base station system (BSS) 110, and an operation and support system (OSS) 115. The SS 105 performs subscriber-related functions, as well as call processing within the GSM network 100 and between the GSM network 100 and other voice/data systems, such as a public switched telephone network (PSTN) 120, other public land mobile networks (PLMNs) 125, and a packet-switched public data network (PSPDN) 130. The SS 105 includes the following functional units: a home location register (HLR) 135, a visitor location register (VLR) 140, an authentication center (AUC) 142, an equipment identity register (EIR) 145, and a mobile services switching center (MSC) 150. The SS 105 also includes a gateway mobile services switching center (GMSC) 155, a GSM interworking unit (GIWU) 160, a message center (MXE) 165, and a mobile service node (MSN) 170. It should be noted that the network elements shown are not necessarily physical elements, but are functional elements of the GSM network, the names of which may vary according to manufacturer. For example the name GIWU indicates an interworking unit manufactured by LUCENT, while the same functional element in at network manufactured by ERICSSON is called a TIGRIS.

The MSC 150 interfaces directly with at least one base station system (BSS) 110 which performs all radio-related functions for the GSM network 100. Although various configurations are possible, the BSS 110 shown in FIG. 3 includes one base station controller (BSC) 180 and three base transceiver stations (BTSs) 185. The BSC 180 is a functional entity that provides and controls the logical interconnection between the MSC 150 and the BTSs 185. The BSC 180 may be physically located with the BTS 185, or may communicate with the BTS 185 via an interface 190, such as an Abis interface. Monitoring and control functions for the GSM network 100 are performed by the operation and support system (OSS) 115.

Each of the three BTSs 185 corresponds to a sector served by the BSS 110. The BTS 185 consists primarily of radio equipment, such as antennas and radio transceivers (TRXs), needed to provide a radio interface to mobile stations operating in a single cell. Each BTS may include several TRXs, typically numbering between 1 and 16.

Various embodiments of systems according to the present invention include a mobile station 195 that is operating within the service area of one of the BTSs 185. The mobile station 195 may be a cellular handset, personal digital assistant (PDA), text pager, multimedia device, personal computer (PC), or any other device that has the capacity to transmit and/or receive data over a wireless communications network such as the exemplary GSM network 100.

Figure 2:
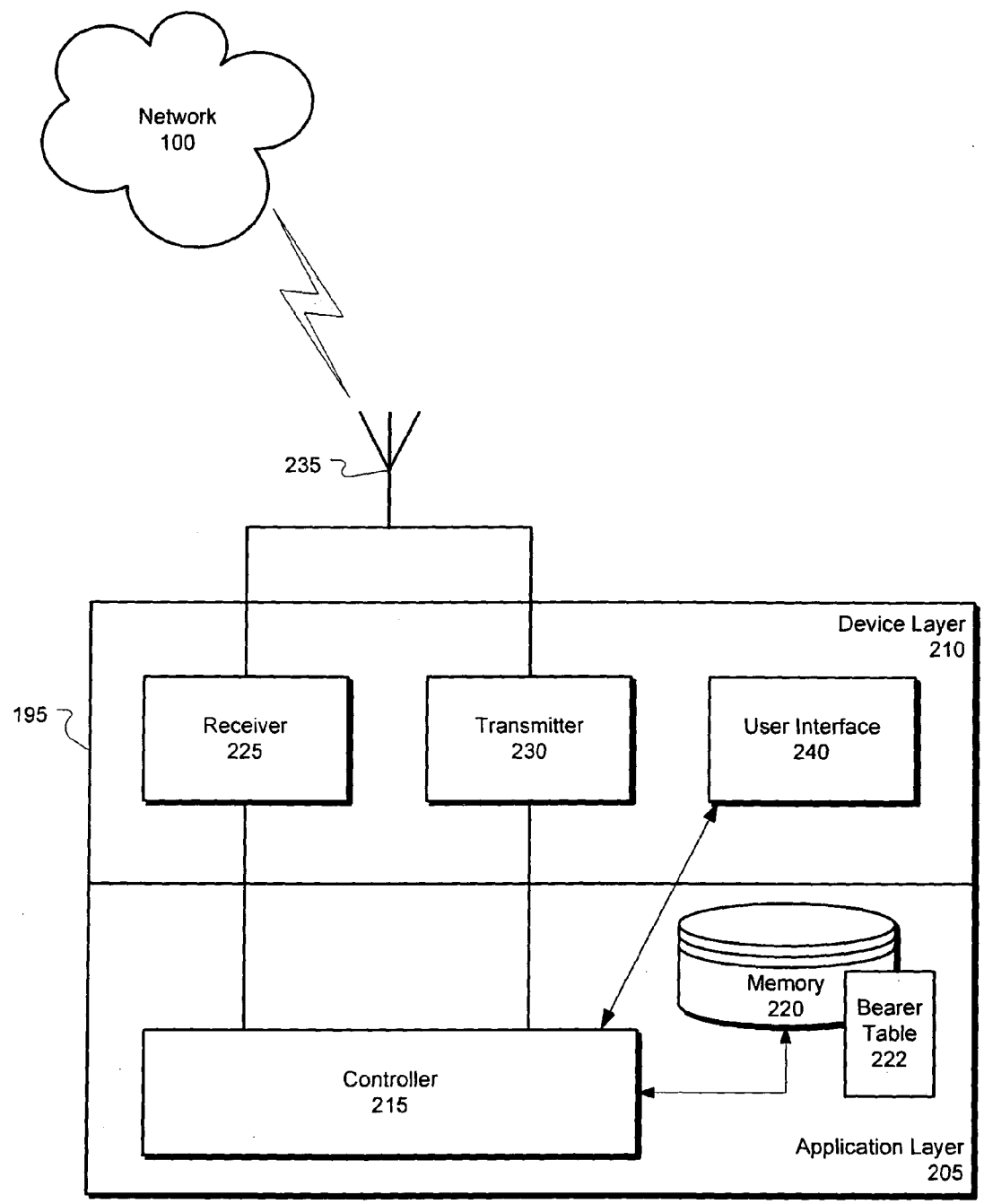
FIG. 2 is a block diagram illustrating certain functional elements of an exemplary mobile station.

FIG. 2 is a block diagram illustrating certain functional elements of an exemplary mobile station 195. Preferably, the mobile station 195 includes an application layer 205 and a device layer 210. The application layer 205 includes a processing element shown as controller 215. The controller 215 can be any suitable microprocessor circuit, microcontroller, or similar data processing device that executes program instructions stored in a memory 220. The memory 220 can be implemented using any suitable combination of readable, writable, and/or re-writable volatile (e.g., dynamic RAM or static RAM) or non-volatile (e.g., EEPROM or flash) memory elements.

The program instructions cause the device layer 210 to implement the methods of the various embodiments of the invention. The program instructions may be hard-coded into the memory 220, or may be reprogrammable via a broadcast or direct wireless transmission such as SMS, or via a physical connection to a docking station or cradle (not shown).

At least some of the program instructions in the memory 220 facilitate access to wireless data services using a communications protocol and application environment, which in the exemplary embodiment, is the Wireless Application Protocol (WAP). WAP can be implemented on any suitable operating system, including PalmOS, EPOC, WINDOWS CE, FLEXOS, OS/9, and JavaOS. WAP is operates on any suitable wireless network air interface, using existing or yet to be developed standard data bearer services such as Short Message Service (SMS), Circuit-Switched Data (CSD), High-Speed Circuit-Switched Data (HSCSD), General Packet Radio Service (GPRS), and Unstructured Supplementary Services Data (USSD).

Bearer services offer differing levels of quality of service with respect to throughput, error rate, and delays, a fact which bears upon the selection of the optimal bearer for any given data call. The Wireless Datagram Protocol (WDP) layer of the WAP stack works in conjunction with the WAP Network Layer, providing an interface between WAP applications and a variety of bearers. Since the WDP layer provides the convergence between the bearer service and the rest of the WAP stack, the WDP specification lists the bearers that are supported and the techniques used to allow WAP applications to run over each bearer. It is contemplated that the list of bearers supported in the WAP protocol will change as the wireless market evolves. It is also contemplated that the WAP protocol will change and/or be superceded by a similar protocol that utilizes the same or other data bearers.

SMS is an available bearer for transmitting data using control channels in a wireless network such as the exemplary GSM network 100. Given its limited length of 160 characters per short message, SMS is generally not an optimal bearer for WAP. The overhead of the WAP protocol would mean that simple transactions may in fact require several SMS messages to be sent, making utilization of SMS as a bearer time consuming and expensive.

With CSD, a physical path is obtained for and dedicated to a single connection between two end-points in the network 100 for the duration of the connection. CSD injects latency into the call setup process, with a session request resulting in about a 10 second delay to connect the WAP client (the mobile station 195) to the WAP Gateway in the case of an end-to-end digital call. However, if analog modem handshaking is required, such as where the mobile station 195 does not support the V.110 digital protocol, or the WAP Gateway does not have a digital direct connection such as ISDN into the network 100, the connect time can extend to about 30 seconds. HSCSD provides circuit-switched wireless data transmission at data rates up to 38.4 Kbps.

USSD is an available data bearer for transmitting information or instructions over a GSM network using the signaling path of a GSM network, such as the exemplary network 100. USSD text messages cannot exceed 182 characters in length. However, unlike SMS, USSD is session-oriented such that when the mobile station 195 accesses a USSD service, a session is established and the radio connection stays open until the mobile station 195, the application, or a predefined time-out releases it. This session-based feature reduces turnaround response times for interactive applications for USSD as compared to SMS. In fact, USSD can be up to seven times faster than SMS to carry out the same two-way transaction. In addition, because USSD commands are routed back to the network's HLR 135, accessing services using USSD as the data bearer works just as well and in exactly the same way when the mobile station 195 is roaming. To utilize USSD, the mobile station 195 must have the ability to operate on a GSM network.

General Packet Radio Service (GPRS) is a service that allows information to be sent and received across the network 100, and currently supplements CSD and SMS. However, to enable GPRS on the exemplary GSM network 100 requires the addition of a Gateway GPRS Service Node (GGSN), a Serving GPRS Service Node (SGSN), Packet Control Units, mobility management to locate GPRS mobile stations, a packet traffic air interface, and security features such as ciphering and GPRS-specific signaling.

Preferably, the memory 220 in the application layer 205 includes a bearer table 222 or other repository that includes information associated with all data bearers that are available to the mobile station.

Referring again to FIG. 2, the device layer 210 of the mobile station 195 includes the physical and functional radio frequency (RF) components required for transmitting and receiving wireless communications. More specifically, the device layer 210 includes a receiver 225, a transmitter 230, and an antenna 235, the components and functions of each being familiar to those skilled in the art.

The application layer 205 is operatively connected to the device layer 210, such that the controller 215 controls and/or monitors the operations of the transmitter 230 and the receiver 225, which are both operatively connected to the antenna 235. The controller 215 controls elements of the device layer 210 according to the program instructions, and/or according operator input received via a user interface 240 (input/output device), such as any integral or remote combination of keypad and viewable display functionality.

Figure 3:
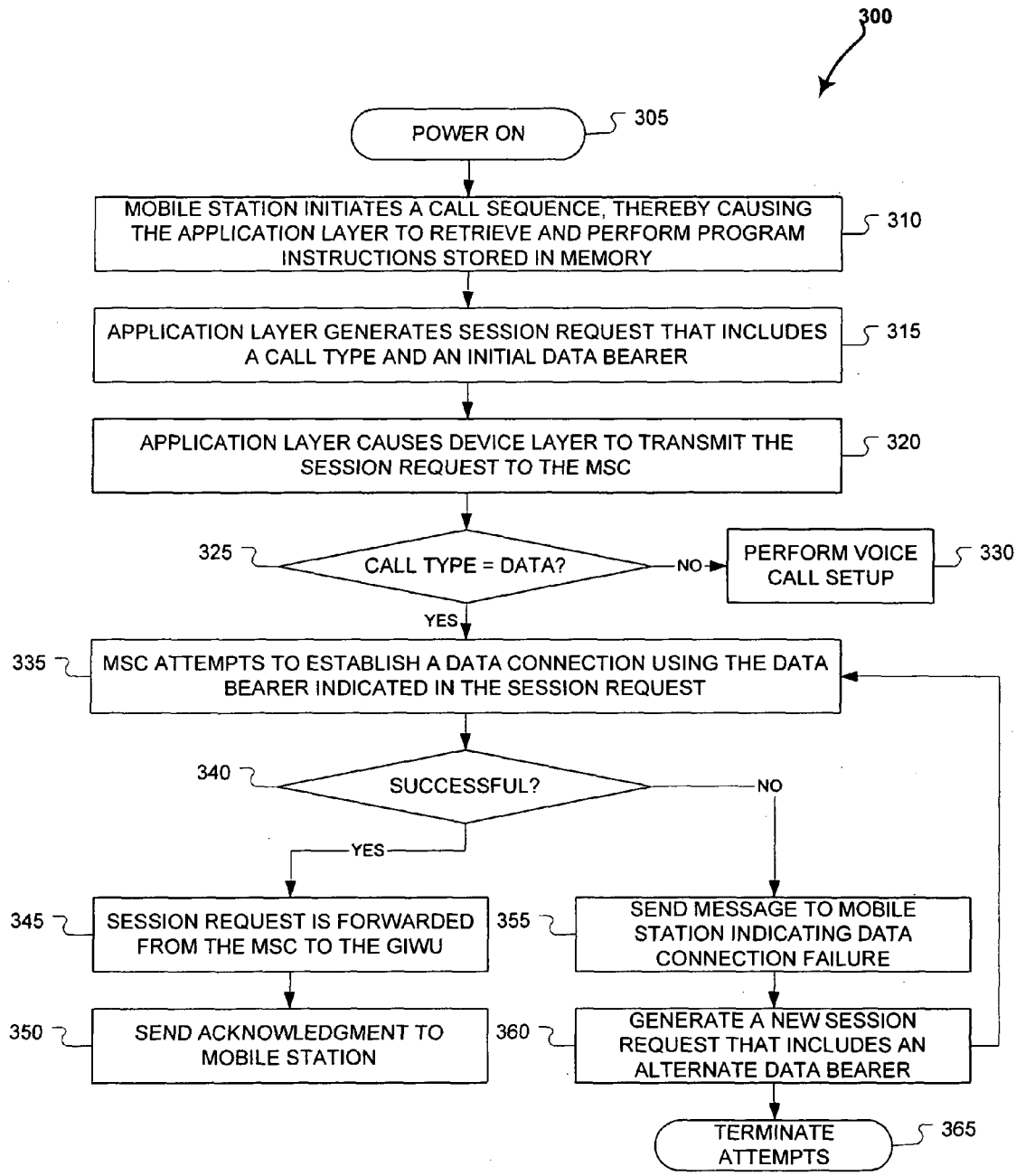
FIG. 3 is a flowchart illustrating an exemplary method according to certain embodiments of the invention.

An exemplary method 300 according to certain embodiments of the invention will now be described, with reference to the flowchart of FIG. 3. It is contemplated that, in this or another embodiment, the steps may be performed in the order shown or in any order that achieves the results described herein, and that one or more steps can be omitted, combined, or substituted with functionally equivalent steps according to various wireless networks, devices, protocols, and techniques.

The method 300 commences when, at step 305, the mobile station is powered on, which typically triggers a registration protocol during which the mobile station sends identifying information to the network and is authenticated by the HLR. At step 310, the mobile station initiates a call sequence, typically in response to user interaction with the mobile station via the user interface. Alternatively, the call sequence can be initiated automatically by an application resident in the memory of the mobile station, or by a remote trigger. The user interaction or other trigger invokes the controller to perform program instructions stored in the memory. At step 315, the program instructions cause the application layer of the mobile station to generate a session request. The session request consists at least in part of a data string, which specifies a call type that indicates whether the requested session is a voice or data call. If the call type selected is data, the session request may also identify the data or data type (e.g., text or multimedia) requested and/or the data bearer that is to be used to set up a data call. As mentioned above, various methods for selecting this initial data bearer are known, and any known or yet to be developed selection criteria can be employed along with the systems and methods of the invention, including selection of the initial data bearer according to the data requested or according to a predefined or predetermined default.

Then, at step 320, the application layer causes the device layer to transmit the session request to the MSC in the GSM network. In the exemplary embodiment, the session request is transmitted over a control channel in the GSM network. For the purpose of example only, assume that the mobile station is GSM and GPRS enabled, and that the initial data bearer is USSD.

At step 325, the session request is processed at the MSC, which determines whether the requested session is for a voice call or a data call. If the session request is for a voice call, the method proceeds to step 330, where the MSC sets up a voice path (e.g., authenticates with the HLR, establishes a connection to the call recipient, notifies the mobile station that the path has been established, and instructs the mobile station to tune its radio to the voice channel that has been provisioned for the call). In the exemplary embodiment, the session request is for a data call, so the method proceeds to step 335.

At step 335, the MSC attempts to set up a data path using the initial data bearer indicated in the session request. At step 340, the MSC determines whether the session request can be fulfilled with the requested initial data bearer. If the session request can be fulfilled with the requested initial data bearer, then at step 345, the session request is referred from the MSC to the GIWU, where the RF to IP (Internet protocol) conversion takes place. The method proceeds from step 345 to 350 where a session status message such as an acknowledgement (ACK) is sent to the mobile station to indicate that the data transaction can now begin.

If the session request cannot be fulfilled with the requested initial data bearer, then the method proceeds to step 355, where a message is sent to the application layer of the mobile station to indicate that the device layer has failed to receive a connection for the data call. Step 355 may also entail translating the connection failure message into a user notification message via the user interface. For example, the screen of the mobile station may display "BEARER UNAVAILABLE, TRYING ALTERNATE BEARER."

Then, at step 360, the connection failure message invokes program instructions stored in the memory which cause the application layer to once again generate a session request. The new session request includes an alternate data bearer retrieved from the bearer table, which may be the second best alternative to the initial data bearer with respect to the level of quality of service that the respective data bearers can provide. Alternatively, the alternate data bearer may simply be the next data bearer in the bearer table. Returning to the example, the alternate data bearer may be GPRS.

The method then begins to loop by returning to step 335, where the MSC again attempts to set up a data path, this time using the alternate data bearer indicated in the new session request. If, at step 340, the MSC determines that the session request cannot be fulfilled with the requested initial data bearer, then the method proceeds to steps 355 and 360, where another alternate data bearer is selected from the bearer table and integrated into a new session request. Returning to the example, the next alternate data bearer can be CSD or HSCSD. Note that when either circuit switched data option is selected, the session request may also include an indication that either an ISDN or analog circuit is to be established. As an example, the application layer may make this determination based on whether the mobile station is operating in its home network as indicated by the Mobile Country Code (MCC) and Mobile Network Code (MNC) received at registration (step 305).

The method 300 continues to cycle through steps 335 through 360 until, at step 365, the attempts to establish the data call terminate upon the occurrence of a predefined event, which may be for example, successful establishment of a data connection, completion of a predetermined number of attempts, expiration of a predetermined time period, user cancellation of the data call, or exhaustion of options presented by the bearer table. The potential terminating event can also be cancellation of the attempts by the network. For example, the MSC may disallow more than a certain number of attempts, after which it may refuse to establish the session for the mobile station, such as sending a message that overrides the program instructions in the mobile station.

Additions, deletions, substitutions, and/or modifications can be made to the systems and processes disclosed herein and the elements or embodiments thereof without departing from the spirit and scope of various principles, features, aspects, and advantages of the present invention. For example, in the exemplary embodiment, a new session request is transmitted if the initial or a subsequent session request is not fulfilled. However, rather than generating a new session request, the application layer of the mobile station may simply update the original session request, for example, by transmitting a new data bearer identifier.

The invention claimed is:

1. A method for automatically selecting an available data bearer for a data call initiated by a mobile station, comprising:
   initiating a data call sequence;
   generating a session request;
   transmitting the session request to a wireless network;
   receiving a session status message from the wireless network, the session status message indicating whether the session requested was successfully established; and
   if the session requested was not successfully established, the mobile station automatically generating and transmitting a new session request, the new session request indicating an alternate data bearer for the data call;
   wherein initiating a data call sequence comprises invoking program instructions stored in a memory element in response to a trigger event.

2. The method of claim 1, wherein the trigger event is user interaction via a user interface.

3. The method of claim 1, wherein the trigger event is a scheduled data call.

4. The method of claim 1, wherein generating the session request comprises generating a data string that includes at least one of the following data elements: a call type, information identifying an initial data bearer, and information regarding data to be accessed via the voice call.

5. The method of claim 1, wherein transmitting the session request comprises sending the session request over a control channel of the wireless network.

6. The method of claim 1, wherein transmitting the session request comprises sending the session request to a mobile switching center (MSC).

7. The method of claim 1, further comprising upon receiving the session status message, displaying information indicating whether the session requested was successfully established on a display component of the mobile station.

8. The method of claim 1, further comprising if the session requested was successfully established, commencing the data call.

9. The method of claim 1, further comprising:
   prior to generating and transmitting a new session request, determining whether a terminating event has occurred; and
   if a terminating event has occurred, canceling the data call initiated by the mobile station.

10. The method of claim 9, wherein determining whether a terminating event has occurred comprises determining whether the current data call has been attempted using each data bearer in a table of data bearers at least a predetermined number of times.

11. The method of claim 9, wherein determining whether a terminating event has occurred comprises determining whether a predetermined number of attempts have been made to successfully establish the session requested.

12. The method of claim 9, wherein determining whether a terminating event has occurred comprises determining whether a predetermined amount of time has elapsed.

13. The method of claim 9, wherein determining whether a terminating event has occurred comprises determining whether external intervention has occurred.

14. The method of claim 1, wherein generating and transmitting the new session request that indicates the alternate data bearer comprises accessing a table of data bearers stored in a memory component of the mobile station.

15. A mobile station that automatically selects an available data bearer for a data call over a wireless network, comprising:
   an application layer, comprising:
      a memory, comprising:
         a table for storing a list of data bearers; and
         program instructions; and
      a controller for invoking program instructions stored in the memory in response to initiation of a data call, the program instructions causing the controller to:
         generate a session request;
         transmit the session request to the wireless network;
         receive a session status message from the wireless network, the session status message indicating whether the session requested was successfully established; and if the session requested was not successfully established, generate and transmit a new session request, the new session request indicating an alternate data bearer for the data call; and a device layer, comprising:
- a user interface, comprising:
  - an input device for receiving commands from a user of the mobile station; and
  - an output device for communicating information regarding the status of the session request to the user of the mobile station;
- a transmitter for sending session requests to the wireless network; and
- a receiver for receiving the session status message.

16. The mobile station of claim 15, wherein the controller is further caused by the program instructions to generate and transmit the new session request that indicates the alternate data bearer by accessing the table for storing a list of data bearers.

17. The mobile station of claim 15, wherein the program instructions cause the controller to generate and transmit a new session request until the occurrence of a terminating event, the terminating event comprising at least one of the following: exhaustion of a predetermined number of attempts to establish the session, exhaustion of the list of data bearers, expiration of a predetermined amount of time, and external intervention.

18. A mobile station that automatically selects an available data bearer for a data call over a wireless network, comprising:
- an application layer, comprising:
  - a memory, comprising:
    - a table for storing a list of data bearers; and
    - program instructions; and
  - a controller for invoking program instructions stored in the memory in response to initiation of a data call, the program instructions causing the controller to:
    - generate a session request;
    - transmit the session request to the wireless network;
    - receive a session status message from the wireless network, the session status message indicating whether the session requested was successfully established; and
    - if the session requested was not successfully established, generate and transmit a new session request, the new session request indicating an alternate data bearer for the data call; and
- a device layer, comprising;
  - a transmitter for sending session requests to the wireless network; and
  - a receiver for receiving the session status message.

19. The mobile station of claim 18, wherein the controller is further caused by the program instructions to generate and transmit the new session request that indicates the alternate data bearer by accessing the table for storing a list of data bearers.

20. The mobile station of claim 18, wherein the program instructions cause the controller to generate and transmit a new session request until the occurrence of a terminating event, the terminating event comprising at least one of the following: exhaustion of a predetermined number of attempts to establish the session, exhaustion of the list of data bearers, expiration of a predetermined amount of time, and external intervention.

21. The mobile station of claim 18, wherein generating a session request comprises identifying an initial data bearer for establishment of the data call.

22. A method performed by a mobile station for automatically selecting an available data bearer for a data call over a wireless network, comprising:
- initiating a data call sequence;
- in response to initiating the data call sequence, invoking program instructions stored in a memory element of the mobile station, the program instructions causing the mobile station to;
  - generate a session request identifying an initial data bearer for establishment of the data call;
  - transmit the session request to the wireless network;
  - receive a session status message from the wireless network, the session status message indicating whether the session requested was successfully established;
  - communicate information regarding the status of the session request to the user of the mobile station via an output device integral to the mobile station; and
  - if the session requested was not successfully established, automatically generate and transmit a new session request, the new session request identifying an alternate data bearer for the data call.

* * * * *